United States Patent
Kallio et al.

(10) Patent No.: US 7,666,957 B2
(45) Date of Patent: Feb. 23, 2010

(54) POLYMERIZATION PROCESS

(75) Inventors: Kalle Kallio, Porvoo (FI); Janne Maaranen, Kerava (FI); Eija Lappi, Porvoo (FI); Marina Surakka, Helsinki (FI)

(73) Assignee: Borealis Technology Oy, Porvoo (FI)

( * ) Notice: Subject to any disclaimer, the term of this patent is extended or adjusted under 35 U.S.C. 154(b) by 400 days.

(21) Appl. No.: 10/585,199

(22) PCT Filed: Dec. 27, 2004

(86) PCT No.: PCT/EP2004/014738

§ 371 (c)(1),
(2), (4) Date: Aug. 8, 2006

(87) PCT Pub. No.: WO2005/063830

PCT Pub. Date: Jul. 14, 2005

(65) Prior Publication Data

US 2008/0269435 A1 Oct. 30, 2008

(30) Foreign Application Priority Data

Dec. 30, 2003 (EP) .................. 03258235

(51) Int. Cl.
*C08F 2/38* (2006.01)
*C08F 2/04* (2006.01)
*C08F 2/12* (2006.01)
*B01J 19/18* (2006.01)

(52) U.S. Cl. .............. 526/70; 526/64; 526/65; 526/905; 422/132

(58) Field of Classification Search .............. 526/65, 526/70, 904, 905, 64; 422/131, 132
See application file for complete search history.

(56) References Cited

U.S. PATENT DOCUMENTS

| 3,193,360 | A * | 7/1965 | Scoggin ............... 422/132 |
| 2002/0065376 | A1 | 5/2002 | Bell et al. ............... 526/70 |
| 2004/0044153 | A1* | 3/2004 | Ehrman et al. ............ 526/113 |
| 2005/0234203 | A1* | 10/2005 | McGrath .............. 526/64 |
| 2006/0160962 | A1* | 7/2006 | Tonti et al. ............. 526/64 |

FOREIGN PATENT DOCUMENTS

| EP | 0 887 379 | 12/1998 |
| EP | 0 690 878 | 12/1999 |

(Continued)

OTHER PUBLICATIONS

Kaminsky et al, Hydrogen transfer reactions of supported metallocene catalysts, J. of Molecular Catalysis A: Chemical 128 (1998) 191-200.*

*Primary Examiner*—Fred M Teskin
(74) *Attorney, Agent, or Firm*—Ballard Spahr LLP

(57) ABSTRACT

A process for the polymerisation of ethylene and optionally at least one $C_{3-20}$ alpha olefin comonomer in the slurry or solution phase in a reactor having a polymer outlet stream, a procatalyst or catalyst feed stream and a hydrogen feed stream, said polymerisation being effected in the presence of a metallocene catalyst, a diluent and hydrogen, wherein said diluent is recycled from said outlet stream to said hydrogen feed stream, said procatalyst or catalyst feed stream is free of hydrogen, said hydrogen feed stream is free of procatalyst or catalyst and said procatalyst or catalyst feed stream does not comprise recycled diluent.

13 Claims, 1 Drawing Sheet

FOREIGN PATENT DOCUMENTS

| EP | 0 781 300 | | 7/2001 |
|---|---|---|---|
| WO | WO 97/43323 | | 11/1997 |
| WO | WO99/16797 | * | 4/1999 |
| WO | WO 00/34341 | | 6/2000 |
| WO | WO 00/53306 | | 11/2000 |

* cited by examiner

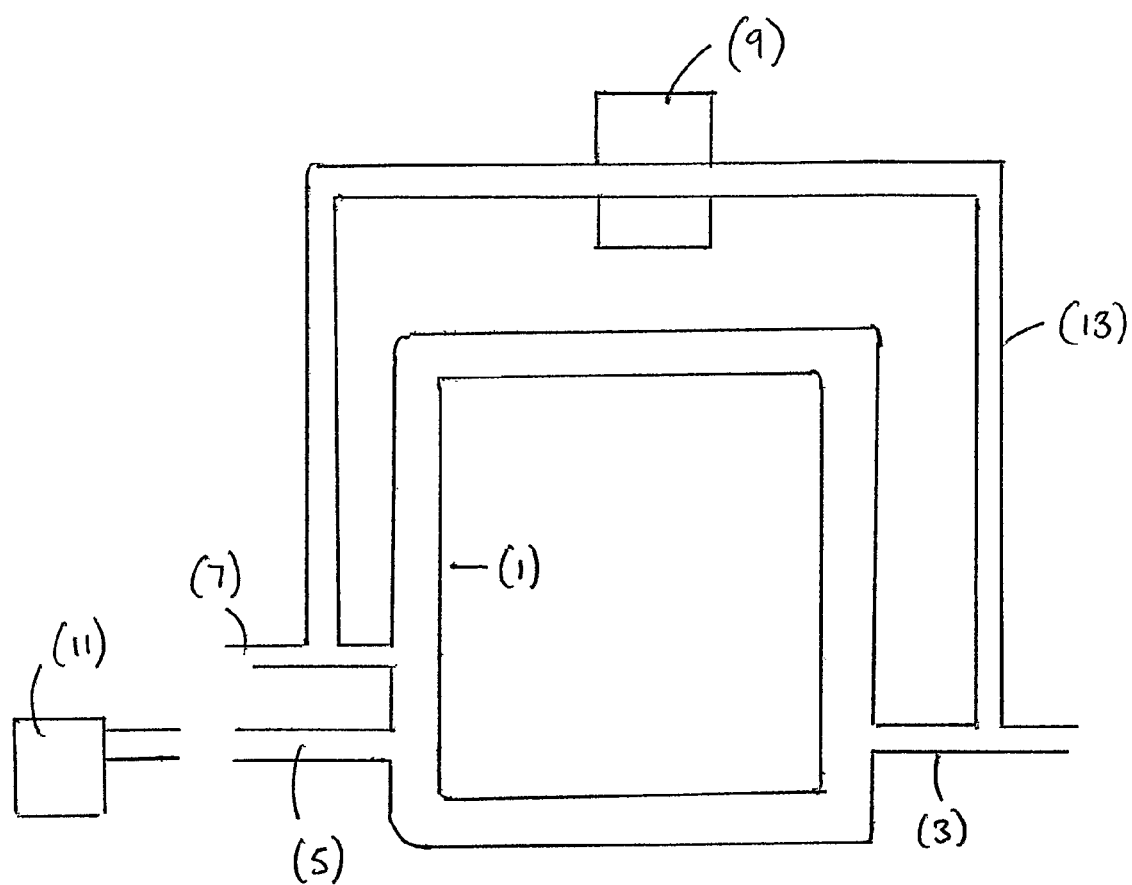

POLYMERIZATION PROCESS

CROSS REFERENCE TO RELATED APPLICATIONS

The present application claims priority to European Patent Application No. 03258235.5, filed Dec. 30, 2003, which application is incorporated herein fully by this reference.

This invention relates to improvements in metallocene catalysed ethylene polymerisations which take place in the presence of hydrogen. In particular, the invention relates to the surprising finding that hydrogen can deactivate the catalyst employed in the polymerisation reaction unless contact between hydrogen and the catalyst is eliminated prior to their entry into the reactor where the polymerisation takes place.

In most Ziegler-Natta and metallocene polymerisations, hydrogen is used to regulate the molecular weight of the formed polymer as is well known in the art. In case of metallocenes, hydrogen sensitivity is 100-1000 times higher than that observed for Zielger-Natta catalysts.

For slurry polymerisation, there are two common ways employed to feed the catalyst, hydrogen, monomers, diluent etc into the slurry polymerisation reactor. In one case, hydrogen, ethylene, comonomer and diluent streams are combined and passed into the reactor. The catalyst stream is combined with a small amount of diluent and passed separately into the reactor.

In a second, less common set up, the hydrogen, ethylene and comonomer stream is combined with the catalyst/diluent stream just prior to reactor entry and a single feed stream enters the reactor.

The polymer slurry recovered at the outlet of the slurry polymerisation reactor is typically directed into polymer recovery or a further polymerisation stage, e.g. a gas phase polymerisation, and the hydrocarbons, such as the diluent, monomer(s) and comonomers, and hydrogen are separated from the polymer slurry. The recovered hydrocarbons may then be directed to a series of purification and separation stages, where the different components may be separated from one another. Eventually, most of the recovered hydrocarbons are recycled back into the polymerisation reactor.

Hence, the main part of the diluent introduced into a polymerisation reactor is typically recycled and only up to 5% of the diluent is absolutely pure, i.e. is not recycled. The recycled diluent may contain small amounts of residual monomer(s), comonomers and hydrogen as impurities.

When particularly active catalysts are introduced into a polymerisation reactor, it is conventional that contact between the monomer(s) and the catalyst before entry into the polymerisation reactor is avoided or minimised. This is to eliminate the risk of polymerisation in the feed lines, eventually leading to plugging of the feed line and reactor shutdown. For this reason and as discussed above, the feed is often divided so that part of the diluent and monomer(s) are introduced along one pipe line into the reactor while the remaining components are introduced along another line, e.g. the line from a prepolymerisation reactor. This means that the catalyst is often added into the reactor potentially in recycled diluent.

The catalyst is usually added into a slurry polymerisation process as a slurry. For example, the catalyst is suspended in diluent and transferred into a catalyst feed vessel. This vessel may be agitated to maintain homogeneous the slurry of the catalyst in diluent, but it may also be non-agitated so that the catalyst is allowed to settle and form a deposit at the bottom of the vessel. The slurry or deposit is then metered into the polymerisation reactor by using conventional methods, like shot injectors as disclosed in EP 428054 and EP 428056. In such arrangements the catalyst may remain in contact with the diluent for a long time, e.g. from several hours up to 1 to 2 days.

BRIEF DESCRIPTION OF THE DRAWINGS

FIG. 1 is a schematic illustration of a polymerisation loop reactor.

DETAILED DESCRIPTION

It has been surprisingly found that when there is contact between a metallocene catalyst and hydrogen prior to catalyst entry into the reactor where polymerisation takes place, a serious deactivation of metallocene catalyst occurs. The seriousness of the deactivation varies from catalyst to catalyst but in all metallocenes tested significant deactivation occurs. It is believed that this is the first time that this effect has been noted and hence the inventors have identified a problem not previously known.

The inventors have found therefore that it is essential to eliminate any contact between the catalyst and hydrogen prior to the components entering the polymerisation reactor. This has significant ramifications for polymerisation reactor set up, in particular on industrial scale where recycling of components is routine for environmental and economic reasons.

In the first of the two common feed methods described above, whilst the main hydrogen feed does not precontact the catalyst, since the diluent stream is normally recycled this is likely to contain traces of hydrogen and hence the catalyst is exposed to hydrogen prior to reactor entry. In the second scenario, the catalyst is also exposed to recycled diluent leading to potential for catalyst deactivation.

It is believed that this is the first time this effect has been noted although some polymer chemists appear to have inadvertently added catalyst and hydrogen to a reactor in separate feeds without appreciating the ramifications of the steps they were taking. Hence, in EP-A-781300 polymerisation is effected in a fluidised bed reactor with a gaseous feed stream comprising ethylene and hydrogen. The catalyst is injected into the bed directly. This polymerisation is not a slurry phase polymerisation and there is no mention of the prevention of catalyst deactivation. Moreover, a diluent is not employed. Other chemists may have used direct catalyst injection to a reactor in bench scale or pilot plant where recycling of diluent is not normal but on industrial scale where recycling is important this deactivation effect is critical.

Hence, viewed from one aspect the invention provides a process for the polymerisation of ethylene and optionally at least one $C_{3-20}$ alpha olefin comonomer in the slurry phase or solution phase in a polymerisation reactor having a polymer outlet stream, a procatalyst or catalyst feed stream and a hydrogen feed stream, said polymerisation being effected in the presence of a metallocene catalyst, a diluent and hydrogen, characterised in that said diluent is recycled from said outlet stream to said hydrogen feed stream, said catalyst feed stream is free of hydrogen, said hydrogen feed stream is free of catalyst and said catalyst feed stream is free of recycled diluent.

Alternatively viewed the invention relates to a process for the polymerisation of ethylene and optionally at least one $C_{3-20}$ alpha olefin comonomer in the slurry phase or solution phase in a polymerisation reactor comprising the steps of:

continuously introducing ethylene and optionally at least one $C_{3-20}$ alpha olefin comonomer into said reactor;

continuously introducing diluent into said reactor;

continuously introducing hydrogen into said reactor;
continuously or intermittently introducing a mixture of diluent and metallocene catalyst into said reactor;
operating the reactor to form a polymer slurry or solution;
continuously or intermittently removing said polymer slurry or solution from said reactor;
subjecting the withdrawn slurry or solution to separation treatment where at least part of the diluent therein is separated from the polymer;
recycling at least part of said separated diluent into the diluent feed;
wherein the diluent feed is free of catalyst and said mixture of diluent and metallocene catalyst is free of recycled diluent.

Viewed from another aspect the invention provides a method for preventing metallocene catalyst deactivation in an ethylene polymerisation process effected in the presence of hydrogen, the improvement comprising feeding said metallocene catalyst to a polymerisation reactor in a feed stream in which hydrogen is absent.

Viewed from a further aspect the invention comprises use of at least two feed streams, a first stream comprising a metallocene catalyst and being free of hydrogen and a second stream comprising hydrogen and being free of metallocene catalyst to prevent metallocene catalyst deactivation in ethylene polymerisation.

The process of the invention should preferably be carried out on an industrial scale.

The term "metallocene catalyst" is used herein to denote the reaction product of a metallocene procatalyst and a cocatalyst. It is possible for the metallocene procatalyst and the cocatalyst to be reacted to form the actual catalytic species (i.e. the metallocene catalyst) prior to injection into the reactor or this reaction can be effected in the reactor itself. In this latter scenario, the metallocene procatalyst feed to the reactor should be free of hydrogen/recycled diluent and the cocatalyst should be fed to the reactor separately under known conditions.

Hydrogen may be fed into the reactor with recycled diluent alone or may be fed to the reactor along with monomer and/or comonomer or combinations thereof. Most commonly, hydrogen is continuously fed to the reactor with recycled diluent, monomer (ethylene) and comonomer, i.e. the hydrogen feed stream preferably comprises hydrogen, ethylene, optional comonomer and recycled diluent. Hydrogen must not however, be fed to the reactor with the metallocene catalyst. In order to avoid catalyst deactivation it is essential to avoid contact between hydrogen and metallocene catalyst unless the monomer is additionally present. Hence, recycled diluent containing traces of hydrogen should not be used to slurry the metallocene catalyst prior to its injection into the polymerisation reactor.

The catalyst is fed to the reactor in a separate feed stream, e.g. via a catalyst feed vessel and may be conveyed to the reactor in a diluent either continuously or intermittently. However, the diluent employed in the catalyst feed must not be recycled to ensure that the diluent is hydrogen free. Conventionally, diluent is recycled from the outlet stream for economic reasons and employed again in both catalyst and hydrogen feed streams. The present inventors have found that even after purification, the recycled diluent contains traces of hydrogen which can detrimentally affect catalyst performance causing deactivation. This is especially true in the catalyst feed vessel, where the catalyst may remain in contact with recycled diluent for a prolonged period, e.g. 2 hours to 1 to 2 days.

By deactivation is meant that the catalyst suffers a loss of activity, i.e. the amount of polymer produced in a given time is less when precontact of hydrogen and the catalyst occurs. Precontact has also been found to cause the catalyst to have an increased induction time. When no contact between catalyst and hydrogen takes place the catalyst typically starts catalysing the polymerisation reaction the instant the reaction is initiated. However, when precontact occurs the inventors have surprisingly found that induction times of at least 5 minutes, e.g. at least 10 minutes are observed, i.e. time when the catalyst does not catalyse the polymerisation reaction.

Diluent recycling and purification can be achieved using known techniques. For example, first the diluent may be separated from the polymer. This may be done by any means known in the art, such as centrifugation and evaporation. The diluent may be selected from inert hydrocarbon compounds, which readily can be separated from the monomers and other components used in polymerisation, like hydrogen. Preferably, the diluent is an alkane containing from 2 to 20 carbon atoms. More preferably, the diluent is a low-boiling alkane containing from 3 to 6 carbon atoms, like propane, n-butane, isobutane, n-pentane, or n-hexane. Especially preferred are propane, n-butane and isobutane.

After the diluent is separated from the polymer, it may be subjected to different process steps to separate the residual monomer(s), hydrogen, catalyst components, impurities like moisture, and other compounds that may be present. These process steps include, among others, distillation, extraction and treatment in catalytic beds. It is worth noting, however, that each such process step increases both the investment cost and the operating cost of the polymerisation plant.

The recovered diluent is then pressurised, e.g. by using a pump or a compressor, and passed into the hydrogen stream.

The amount of hydrogen in the recycled diluent depends on the product that is made and the nature of the catalyst employed. When a metallocene catalyst is used, the hydrogen content in the diluent may range from 0.1 to 500 ppm (parts per million, based on the number of moles of each component in the diluent), preferably 0.2 to 200 ppm, more preferably 0.5 to 50 ppm, or 1 to 20 ppm (depending on the melt index (MFR) of the polymer that is produced) unless special hydrogen separation techniques are employed. When a Ziegler catalyst is used, the hydrogen concentration in the diluent may be up to 3% by mole, provided that no special hydrogen separation is done. Therefore, during transitioning between a Ziegler-Natta catalyst to a metallocene catalyst the risk of deactivation is increased, if recycled diluent is used in the catalyst handling.

In a further preferred embodiment therefore, the process of the invention is employed where transitioning between Ziegler-Natta and metallocene catalysts takes place. Since hydrogen concentration in the reactor is greater during Ziegler-Natta catalysis, the amount of residual hydrogen in the recycled diluent is higher. When the transitioning begins, the metallocene catalyst would conventionally be slurried with recycled diluent (i.e. containing a high level of hydrogen) before being added to the reactor. Such slurrying can cause deactivation. It is especially important therefore to avoid diluent recycling into the catalyst feed stream where transitioning between Ziegler-Natta and metallocene catalysts takes place.

The polymerisation reaction of the invention takes place in the solution phase or preferably the slurry phase, preferably in a loop reactor as is well known in the art and under conditions described fully below. The concentration of hydrogen used in polymerisation is selected based on the melt index of the polymer that is produced. Typically, the molar ratio of hydrogen to ethylene is from 1 to 2000 moles of hydrogen per million moles of ethylene, preferably from 5 to 1000, more preferably from 10 to 500 and in particular 20 to 200 moles of hydrogen per million moles of ethylene. The amount of monomer, comonomer, diluent and catalyst employed may vary and will be readily determined by the skilled chemist.

In a highly preferred embodiment the catalyst is prepolymerised as is well known in the art.

The slurry phase polymerisation of the invention should preferably be followed by a gas phase polymerisation. Such technology involving slurry phase/gas phase polymerisation stages has been developed by Borealis and is called Borstar Technology. The slurry phase may however be the only stage in the polymerization or may be followed by further slurry stages.

The metallocene procatalyst may have a formula II:

$$(Cp)_m R_n MX_q \quad \text{(II)}$$

wherein:

each Cp independently is an unsubstituted or substituted and/or fused homo- or heterocyclopentadienyl ligand, e.g. substituted or unsubstituted cyclopentadienyl, substituted or unsubstituted indenyl or substituted or unsubstituted fluorenyl ligand; the optional one or more substituent(s) being independently selected preferably from halogen, hydrocarbyl (e.g. C1-C20-alkyl, C2-C20-alkenyl, C2-C20-alkynyl, C3-C12-cycloalkyl, C6-C20-aryl or C7-C20-arylalkyl), C3-C12-cycloalkyl which contains 1, 2, 3 or 4 heteroatom(s) in the ring moiety, C6-C20-heteroaryl, C1-C20-haloalkyl, —SiR"$_3$, —OSiR"$_3$, —SR", —PR"$_2$ or —NR"$_2$, each R" is independently a hydrogen or hydrocarbyl, e.g. C1-C20-alkyl, C2-C20-alkenyl, C2-C20-alkynyl, C3-C12-cycloalkyl or C6-C20-aryl; or e.g. in case of —NR"$_2$, the two substituents R" can form a ring, e.g. five- or six-membered ring, together with the nitrogen atom wherein they are attached to;

R is a bridge of 1-7 atoms, e.g. a bridge of 1-4 C-atoms and 0-4 heteroatoms, wherein the heteroatom(s) can be e.g. Si, Ge and/or O atom(s), whereby each of the bridge atoms may bear independently substituents, such as C1-C20-alkyl, tri(C1-C20-alkyl)silyl, tri(C1-C20-alkyl)siloxy or C6-C20-aryl substituents); or a bridge of 1-3, e.g. one or two, hetero atoms, such as silicon, germanium and/or oxygen atom(s), e.g. —SiR$^1$$_2$—, wherein each R$^1$ is independently C1-C20-alkyl, C6-C20-aryl or tri(C1-C20-alkyl)silyl-residue, such as trimethylsilyl;

M is a transition metal of Group 3 to 10, preferably of Group 4 to 6, such as Group 4, e.g. Ti, Zr or Hf, especially Hf each X is independently a sigma-ligand, such as H, halogen, C1-C20-alkyl, C1-C20-alkoxy, C2-C20-alkenyl, C2-C20-alkynyl, C3-C12-cycloalkyl, C6-C20-aryl, C6-C20-aryloxy, C7-C20-arylalkyl, C7-C20-arylalkenyl, —SR", —PR"$_3$, —SiR"$_3$, —OSiR"$_3$, —NR"$_2$ or —CH$_2$—Y, wherein Y is C6-C20-aryl, C6-C20-heteroaryl, C1-C20-alkoxy, C6-C20-aryloxy, NR"$_2$, —SR", —PR"$_3$, —SiR"$_3$, or —OSiR"$_3$;

each of the above mentioned ring moiety alone or as a part of another moiety as the substituent for Cp, X, R" or R$^1$ can further be substituted e.g. with C1-C20-alkyl which may contain Si and/or O atoms;

n is 0, 1 or 2, e.g. 0 or 1,
m is 1, 2 or 3, e.g. 1 or 2,
q is 1, 2 or 3, e.g. 2 or 3, wherein m+q is equal to the valency of M.

Suitably, in each X as —CH$_2$—Y, each Y is independently selected from C6-C20-aryl, NR"$_2$, —SiR"$_3$ or —OSiR"$_3$. Most preferably, X as —CH$_2$—Y is benzyl. Each X other than —CH$_2$—Y is independently halogen, C1-C20-alkyl, C1-C20-alkoxy, C6-C20-aryl, C7-C20-arylalkenyl or —NR"$_2$ as defined above, e.g. —N(C1-C20-alkyl)$_2$.

Preferably, q is 2, each X is halogen or —CH$_2$—Y, and each Y is independently as defined above.

Cp is preferably cyclopentadienyl, indenyl, tetrahydroindenyl or fluorenyl, optionally substituted as defined above and may further bear a fused ring of 3 to 7 atoms, e.g. 4, 5 or 6, which ring may be aromatic or partially saturated.

In a suitable subgroup of the compounds of formula II, each Cp independently bears 1, 2, 3 or 4 substituents as defined above, preferably 1, 2 or 3, such as 1 or 2 substituents, which are preferably selected from C1-C20-alkyl, C6-C20-aryl, C7-C20-arylalkyl (wherein the aryl ring alone or as a part of a further moiety may further be substituted as indicated above), —OSiR"$_3$, wherein R" is as indicated above, preferably C1-C20-alkyl.

R, if present, is preferably a methylene, ethylene or a silyl bridge, whereby the silyl can be substituted as defined above, e.g. a (dimethyl)Si=, (methylphenyl)Si= or (trimethylsilylmethyl)Si=; n is 0 or 1; m is 2 and q is two. Preferably, R" is other than hydrogen.

A specific subgroup includes the well known metallocenes of Zr, Hf and Ti with two eta$^5$-ligands which may be bridged or unbridged cyclopentadienyl ligands optionally substituted with e.g. siloxy, or alkyl (e.g. C1-6-alkyl) as defined above, or with two unbridged or bridged indenyl ligands optionally substituted in any of the ring moieties with e.g. siloxy or alkyl as defined above, e.g. at 2-, 3-, 4- and/or 7-positions, preferred bridges being ethylene or —SiMe$_2$.

Further preferred metallocenes include those of formula $$Cp'_2 MX'_2$$

wherein M is as hereinbefore defined; each X' is halogen, diC$_{1-6}$-alkylamido, C$_{1-6}$ alkyl, benzyl or hydrogen;

each Cp' is a cyclopentadienyl or indenyl group optionally substituted by one or more groups selected from C$_{1-10}$ hydrocarbyl or siloxy (e.g. triC$_{1-6}$alkylsiloxy), said Cp' groups being optionally bridged, e.g. via an ethylene or dimethylsilyl link. Bis (n-butylcyclopentadienyl) hafnium dichloride, bis (n-butylcyclopentadienyl) zirconium dichloride and ethylene bis(2-t-butyldimethylsiloxyindenyl) hafnium complexes are particularly preferred.

The preparation of the metallocenes of the invention can be carried out according or analogously to the methods known from the literature and is within skills of a person skilled in the field. Thus for the preparation see e.g. EP-A-129 368, examples of compounds wherein the metal atom bears a —NR"$_2$ ligand see i.a. in WO-A-9856831 and WO-A-0034341. For the preparation see also e.g. in EP-A-260 130, WO-A-9728170, WO-A-9846616, WO-A-9849208, WO-A-9912981, WO-A-9919335, WO-A-9856831, WO-A-00/34341, EP-A-423 101 and EP-A-537 130.

Alternatively, in a further subgroup of the metallocene compounds, the metal bears a Cp group as defined above and additionally a eta$^1$ or eta$^2$ ligand, wherein said ligands may or may not be bridged to each other. Such compounds are described e.g. in WO-A-9613529, the contents of which are incorporated herein by reference.

Highly preferred metallocene procatalysts are those listed in the examples.

Metallocene procatalysts are generally used as part of a catalyst system which also includes a cocatalyst or catalyst activator, for example, an aluminoxane (e.g. methylaluminoxane (MAO), hexaisobutylaluminoxane and tetraisobutylaluminoxane) or a boron compound (e.g. a fluoroboron compound such as triphenylpentafluoroboron or triphenylcarbenium tetraphenylpentafluoroborate (($(C_6H_5)_3$C$^+$B—$(C_6F_5)_4$)).

Traditionally, the most widely used alumoxane is methylalumoxane (MAO), an alumoxane compound in which the R groups are methyls. MAO however is poorly characterised and relatively expensive and efforts have been made to use alumoxanes other than MAO. Thus, for example WO98/

32775 (Borealis) proposes the use of metallocene procatalysts with alumoxanes in which R is a $C_{2-10}$ alkyl group, eg hexaisobutylalumoxane (HIBAO).

If desired the procatalyst, procatalyst/cocatalyst mixture or a procatalyst/cocatalyst reaction product may be used in unsupported form or it may be precipitated and used as such. However the metallocene procatalyst or its reaction product with the cocatalyst is preferably introduced into the polymerization reactor in supported form, eg impregnated into a porous particulate support as is well known in the art.

The support is preferably a metal or pseudo metal oxide such as silica, alumina or zirconia or a mixed oxide such as silica-alumina, in particular silica, alumina or silica-alumina.

Especially preferably the support is a porous material so that the metallocene may be loaded into the pores of the support, e.g. using a process analogous to those described in WO94/14856 (Mobil), WO95/12622 (Borealis) and WO96/00243 (Exxon). The particle size is not critical but is preferably in the range 5 to 200 um, more preferably 20 to 80 um.

Before loading, the particulate support material is preferably calcined. The support may also be treated with an alkylating agent before being loaded with the metallocene as is known in the art. The support may also carry the cocatalyst/ionic activator as is known in the art.

The olefin polymerized in the method of the invention is ethylene or ethylene and at least one alpha-olefin, for example $C_{3-20}$ alpha-olefins, e.g, propene, n-but-1-ene, n-hex-1-ene, 4-methyl-pent-1-ene, n-oct-1-ene etc. The olefins polymerized in the method of the invention may include any compound which includes unsaturated polymerizable groups. Thus for example unsaturated compounds, such as $C_{6-20}$ olefins (including cyclic and polycyclic olefins (e.g. norbornene)), and polyenes, especially $C_{6-20}$ dienes, may be included in a comonomer mixture with lower olefins, e.g. $C_{2-5}$-olefins. Diolefins (ie. dienes) are suitably used for introducing long chain branching into the resultant polymer. Examples of such dienes include, linear dienes such as 1,5-hexadiene, 1,6-heptadiene, 1,8-nonadiene, 1,9-decadiene, etc.

Comonomers, such as $C_{4-6}$ alkenes, will generally be incorporated to contribute to the mechanical strength of the polymer product.

Usually metallocene catalysts yield relatively narrow molecular weight distribution polymers; however, if desired, the nature of the monomer/monomer mixture and the polymerization conditions may be changed during the polymerization process so as to produce a broad bimodal or multimodal molecular weight distribution (MWD) in the final polymer product. In such a broad MWD product, the higher molecular weight component contributes to the strength of the end product while the lower molecular weight component contributes to the processability of the product, e.g. enabling the product to be used in extrusion and blow moulding processes, for example for the preparation of tubes, pipes, containers, films etc.

A multimodal MWD can be produced using a catalyst material with two or more different types of active polymerization sites, e.g. with one such site provided by the metallocene on the support and further sites being provided by further catalysts, e.g. Ziegler catalysts, other metallocenes, etc. included in the catalyst material.

For solution phase reactors, the reaction temperature used will generally be in the range 130 to 270° C., the reactor pressure will generally be in the range 20 to 400 bar and the residence time will generally be in the range 0.1 to 1 hour. The solvent used will commonly be a hydrocarbon with a boiling point in the range 80-200° C.

For slurry reactors, the reaction temperature will generally be in the range 60 to 110° C. (e.g. 85-110° C.), the reactor pressure will generally be in the range 5 to 80 bar (e.g. 50-65 bar), and the residence time will generally be in the range 0.3 to 5 hours (e.g. 0.5 to 2 hours). The diluent used will generally be an aliphatic hydrocarbon having a boiling point in the range −70 to +100° C. In such reactors, polymerization may if desired be effected under supercritical conditions.

For gas phase reactors, the reaction temperature used will generally be in the range 60 to 115° C. (e.g. 70 to 110° C.), the reactor pressure will generally be in the range 10 to 25 bar, and the residence time will generally be 1 to 8 hours. The gas used will commonly be a non-reactive gas such as nitrogen together with monomer (e.g. ethylene).

The invention will be described further with reference to FIG. 1. Polymerisation loop reactor (1) has a polymer slurry outlet (3), catalyst feed inlet (5) and hydrogen feed inlet (7). Diluent is recycled from outlet (3) via recycling apparatus (9) in conduit (13) to the inlet (7). The catalyst feed may derive from prepolymerisation reactor (11).

Viewed from another aspect therefore, the invention provides a slurry polymerisation reactor having a polymer slurry outlet, catalyst feed inlet and hydrogen feed inlet, said slurry outlet having a conduit connecting to said hydrogen feed inlet adapted to allow recycling of diluent from said polymer slurry to said hydrogen feed.

All publications referred to herein are hereby incorporated by reference.

EXPERIMENTAL PROCEDURES

Catalyst Components

TABLE 1

Used Catalyst Components.

| | Structure | Background |
|---|---|---|
| Compound 1 | | $C_{18}H_{26}Cl_2Zr$<br>$M_w = 404.53$ g mol$^{-1}$<br>Producer/trade name: Witco, EURECEN 5031 |

TABLE 1-continued

Used Catalyst Components.

| | Structure | Background |
|---|---|---|
| Compound 2 | | $C_{34}H_{50}NO_2ClZrSi_2$<br>$M_w = 687.62$ g mol$^{-1}$<br>Preparation EP 1137677 |
| Compound 3 | | $C_{18}H_{26}Cl_2Hf$<br>$M_w = 491.80$ g mol$^{-1}$<br>C 43.96% H 5.33% Cl 14.42% Hf 36.29%<br>Producer/trade name: Witco, TA02823 |
| Activator | MAO | Albemarle 30 w % MAO in toluene |
| Silica support 1 | Silica (SiO$_2$)<br>SP9-391 | Grace silica carrier, P.V. = 1.5 mL<br>(740 μmol OH/g SiO$_2$), BET S.A. 230-355 m$^2$/g. |
| Silica support 2 | Silica (SiO$_2$)<br>SP9-393A | Grace silica carrier, P.V. = 1.5 mL<br>(620 μmol OH/g SiO$_2$), BET S.A. 304-313 m$^2$/g. |

Hydrogen Pre-Contact Test Procedure

Hydrogen pre-contact tests were carried out in 5.2 litre reactor. In these pre-contact tests hydrogen was added to the reactor batchwise and no extra hydrogen was added during the polymerisation. Hydrogen and catalyst were kept in the reactor ca. 20 minutes while reactor was heated and then the polymerisation was started normally.

TABLE 2

Hydrogen pre-contact polymerisation test procedure

| Step | |
|---|---|
| 1 | Add 1750 ml of isobutane to the reactor |
| 2 | Add catalyst from the feed vessel by flushing it through with 1750 ml isobutane |
| 3 | Add the amount of hydrogen needed from a pressure container. |
| 4 | Heat to +80° C., stirring 200 rpm |
| 5 | Set 1-hexene amount and purge pre mixing chamber with the Desired ethylene/comonomer/composition |
| 6 | Set stirring speed to 400 rpm |
| 7 | Adjust targeted pressure in reactor with the ethylene |
| 8 | After 60 min polymerisation, reaction was stopped by closing ethylene feed and flashing of the Isobutane diluent. |

Example 1

The catalyst was prepared by preparing complex solution of 103 g compound 1 (see table 1) and 10.07 kg 30 wt % MAO. Precontact time for metallocene/MAO was 2 h at 25-27° C. 10 kg of this complex solution was impregnated slowly on 8000 g of support 1 (see table 1). After 4 h reaction at 25° C. catalyst was dried by nitrogen purge at 55° C. After 6 h drying ready catalyst was recovered. Ready made catalyst has Al/Zr=200 mol/mol.

Polymerisation was performed according to polymerisation procedure presented in table 2 with no precontact with H$_2$ and catalyst by using 251 mg of prepared catalyst. The yield of polymer was 731 g.

Example 2

Catalyst prepared according to Example 1 was used.
Polymerisation was performed according to polymerisation procedure presented in table 2 by using 275 mg of prepared catalyst. The amount of hydrogen used during pre-contact time (20 min) was 30 bar/75 ml. The yield on polymer was 514 g.

Example 3

Catalyst was prepared by preparing complex solution of 305.9 mg compound 2 (see table 1) and 19.8 ml 30 w % MAO and 4.4 ml toluene. Precontact time for metallocene/MAO was 60 min. 15 ml of this complex solution was impregnated slowly on 10 g of support 1 (see table 1). After 1 h reaction at 24° C. reaction temperature was raised to 70° C. for 1 h.

Catalyst was dried by nitrogen purge at 70° C. After 3 h drying ready catalyst was recovered. Ready made catalyst has Al/Zr=200 mol/mol Polymerisation was performed according to polymerisation procedure presented in table 2 but NO precontact of $H_2$ and catalyst by using 248 mg of prepared catalyst. The yield on polymer was 740 g.

Example 4

Catalyst prepared according to Example 3 was used.

Polymerisation was performed according to polymerisation procedure presented in table 2 by using 233 mg of prepared catalyst. The amount of hydrogen used during precontact time (20 min) was 25 bar/75 ml. The yield on polymer was 256 g.

Example 5

Catalyst was prepared by preparing complex solution of 156 g compound 3 (see table 1) and 12.6 kg 30 w % MAO. Precontact time for metallocene/MAO was 4 h/25° C. 12.6 kg kg of this complex solution was impregnated slowly on 10 kg of support 2 (see table 1). After 4 h reaction at 25° C. and additional 1 h reaction at 70° C., catalyst was dried by nitrogen purge at 70° C. After 3 h drying ready catalyst was recovered. Ready made catalyst has Al/Hf=200 mol/mol Polymerisation was performed according to polymerisation procedure presented in table 2 but NO precontact of H2 and catalyst by using 440 mg of prepared catalyst. The yield on polymer was 382 g.

Example 6

Catalyst prepared according to Example 5 was used. Polymerisation was performed according to polymerisation procedure presented in table 2 by using 560 mg of prepared catalyst. The amount of hydrogen used during pre-contact time (20 min) was 25 bar/75 ml. The yield on polymer was 0 g.

Example 7

Catalyst prepared according to Example 5 was used.

Polymerisation was performed according to polymerisation procedure presented in table 2 by using 504 mg of prepared catalyst. The amount of hydrogen used during pre-contact time (20 min) was 30 bar/75 ml. The yield on polymer was 0 g.

SUMMARY OF THE EXAMPLES

TABLE 3

Polymerisation results from hydrogen pre-contact tests.

| | Example 1 | Example 2 | Example 3 | Example 4 | Example 5 | Example 6 | Example 7 |
|---|---|---|---|---|---|---|---|
| Catalyst | Catalyst 1 | Catalyst 1 | Catalyst 2 | Catalyst 2 | Catalyst 3 | Catalyst 3 | Catalyst 3 |
| Cat amount mg | 251 | 275 | 248 | 233 | 440 | 560 | 504 |
| $H_2$ | Continuos 2.8 mol/kmol | Precontact 30 bar/75 ml | Continuos 2.5 mol/kmol | Precontact 25 bar/75 ml | Continuos 3.2 mol/kmol | Precontact 25 bar/75 ml | Precontact 30 bar/75 ml |
| $C_6/C_2$ mol/kmol | 32.9 | 32.9 | 49.4 | 49.4 | 56.0 | 49.4 | 49.4 |
| Yield g | 731 | 514 | 740 | 256 | 382 | 0 | 0 |
| Run time min | 58 | 60 | 57 | 70 | 61 | 60 | 60 |
| Activity kg/g/h | 3.0 | 1.9 | 3.0 | 1.1 | 0.9 | 0 | 0 |
| Note | | | | Induction time 10 min | | | |

Temperature 80° C. Total pressure 20.4 bar, $C_2$ = partial pressure 7.0 bar, Run time 60 min The level of deactivation was different depending on the catalyst used. For (nBuCp)$_2$ZrCl$_2$, an approximately one third decrease in the level of activity was observed whereas for (nBuCp)$_2$HfCl$_2$, the effect was enormous, killing the catalyst activity. H$_2$ should not be in pre-contact with metallocene catalysts, especially with (nBuCp)$_2$HfCl$_2$, which can occur in the operation of production scale slurry or solution polymerisation processes.

The invention claimed is:

1. A process for the polymerisation of ethylene or ethylene and at least one C$_{3-20}$ alpha olefin comonomer in the slurry or solution phase in a reactor having a polymer outlet stream, a procatalyst or catalyst feed stream and a hydrogen feed stream, said polymerisation being effected in the presence of a metallocene catalyst, a diluent and hydrogen, wherein said diluent is recycled from said outlet stream to said hydrogen feed stream, said procatalyst or catalyst feed stream is free of hydrogen, said hydrogen feed stream is free of procatalyst or catalyst and said procatalyst or catalyst feed stream does not comprise recycled diluent.

2. A process as claimed in claim 1 wherein the metallocene catalyst is fed to the reactor.

3. A process as claimed in claim 1 wherein said process takes place in the slurry phase.

4. A process as claimed in claim 1 wherein said diluent is propane, n-butane or isobutane.

5. A process as claimed in claim 1 wherein said metallocene catalyst is supported.

6. A process as claimed in claim 1 wherein said comonomer is butene, octene or hexene.

7. A process as claimed in claim 1 further comprising a gas phase polymerisation stage subsequent to said slurry or solution polymerisation.

8. A process as claimed in claim 1 wherein said metallocene catalyst is prepolymerised.

9. A process as claimed in claim 1 wherein said catalyst feed stream comprises a catalyst feed vessel in which said metallocene catalyst is resident for at least 2 hours.

10. A process as claimed in claim 1 wherein prior to said process a Ziegler-Natta catalysed polymerisation is effected.

11. A process as claimed in claim 10 wherein the change from Ziegler-Natta to metallocene catalysis is effected continuously by stopping the feed of Ziegler-Natta catalyst feed and starting metallocene catalyst feed to the reactor.

12. A process as claimed in claim 1 wherein said metallocene catalyst comprises a compound of formula

$$Cp'_2MX'_2$$

wherein M is a group 3 to 10 transition metal;

each X' is halogen, diC$_{1-6}$-alkylamido, C$_{1-6}$ alkyl, benzyl or hydrogen; and each Cp' is an unsubstituted cyclopentadienyl or indenyl group or a cyclopentadienyl or indenyl group substituted by one or more groups selected from the group consisting of C$_{1-10}$ hydrocarbyl and siloxy, said Cp' groups being bridged or not bridged.

13. A process for the polymerisation of ethylene or ethylene and at least one C$_{3-20}$ alpha olefin comonomer in the slurry phase or solution phase in a polymerisation reactor comprising the steps of:

continuously introducing ethylene or ethylene and at least one C$_{3-20}$ alpha olefin comonomer into said reactor; continuously introducing diluent into said reactor; continuously introducing hydrogen into said reactor;

continuously or intermittently introducing a mixture of diluent and metallocene catalyst into said reactor;

operating the reactor to form a polymer slurry or solution;

continuously or intermittently removing said polymer slurry or solution from said reactor;

subjecting the withdrawn slurry or solution to separation treatment where at least part of the diluent therein is separated from the polymer;

recycling at least part of said separated diluent into the diluent feed;

wherein the diluent feed is free of catalyst and said mixture of diluent and metallocene catalyst is free of recycled diluent.

* * * * *